(12) United States Patent
Asai

(10) Patent No.: US 8,270,011 B2
(45) Date of Patent: Sep. 18, 2012

(54) REQUESTING CONFIGURATION INFORMATION FROM A PRINTER

(75) Inventor: Daisuke Asai, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 970 days.

(21) Appl. No.: 12/130,030

(22) Filed: May 30, 2008

(65) Prior Publication Data

US 2008/0297842 A1 Dec. 4, 2008

(30) Foreign Application Priority Data

May 31, 2007 (JP) ................................ 2007-145525

(51) Int. Cl.
*G06F 3/12* (2006.01)
(52) U.S. Cl. ...................................................... 358/1.15
(58) Field of Classification Search .................. 358/1.15
See application file for complete search history.

(56) References Cited

U.S. PATENT DOCUMENTS

| | | | |
|---|---|---|---|
| 7,158,248 B2* | 1/2007 | Smith et al. ................... | 358/1.15 |
| 7,840,697 B2* | 11/2010 | Nishi ............................ | 709/238 |
| 2001/0014601 A1 | 8/2001 | Kuwabara | |
| 2004/0021903 A1* | 2/2004 | Wanda ......................... | 358/1.15 |
| 2005/0068563 A1 | 3/2005 | Nguyen et al. | |
| 2005/0280837 A1 | 12/2005 | Ono et al. | |
| 2006/0028667 A1 | 2/2006 | Saito | |
| 2006/0050294 A1* | 3/2006 | Smith et al. ................... | 358/1.15 |
| 2007/0019214 A1 | 1/2007 | Saito | |
| 2008/0117450 A1* | 5/2008 | Claiborne et al. ............ | 358/1.15 |

FOREIGN PATENT DOCUMENTS

| | | |
|---|---|---|
| JP | 2001-222493 | 8/2001 |
| JP | 2002-166629 | 6/2002 |
| JP | 2002-287913 | 10/2002 |
| JP | 2004-110277 | 4/2004 |
| JP | 2005-092744 | 4/2005 |
| JP | 2005-135390 | 5/2005 |
| JP | 2006-004183 | 1/2006 |
| JP | 2006-048537 | 2/2006 |
| JP | 2006-209534 | 8/2006 |
| JP | 2006-260089 | 9/2006 |
| JP | 2007-018376 | 1/2007 |

OTHER PUBLICATIONS

Decision of Rejection for Japanese Application No. 2007-145525 mailed Aug. 18, 2009.
Notification of Reasons of Rejection for Japanese Application No. 2007-145525, Mailing Date: May 12, 2009.

* cited by examiner

*Primary Examiner* — Benny Q Tieu
*Assistant Examiner* — Eric A Rust
(74) *Attorney, Agent, or Firm* — Banner & Witcoff, Ltd.

(57) ABSTRACT

A print controlling device for transmitting printer controlling information to a printer connected thereto is configured such that print setting data is generated based on desired print settings which may include operational control setting data in accordance with a setting by a user. The print controlling device is capable of generating print data including the print setting data as header information thereof, and converting the print data to the printer controlling information. When the print data is converted, it is judged whether the print setting data included in the print data contains the operational control setting. If the print setting data includes the operational control setting, job controlling information which corresponds to the operational control setting is transmitted to the printer.

12 Claims, 7 Drawing Sheets

```
<print data>
  <print setting>
    <sheet size> A4 </sheet size>
    <number of copies> 2 </number of copies>
    •••
  </print setting>
  <data>
    •••
    <text> test </text>
    •••
    (main data)
  </data>
</print data>
```

FIG.5A

```
<print data>
  <print setting>
    •••
    <serial number acquiring setting> ON </serial number acquiring setting>
    •••
  </print setting>
  <data>
    <text> The printer does not support serial number acquiring function.
    </text>
  </data>
</print data>
```

FIG.5B

```
<print data>
  <print setting>
    •••
    <operational command> @PJL INFORMATION SERIAL </operational command>
    •••
  </print setting>
  <data>
    <text> The printer does not support serial number acquiring function.
    </text>
  </data>
</print data>
```

FIG. 8

REQUESTING CONFIGURATION INFORMATION FROM A PRINTER

CROSS-REFERENCE TO RELATED APPLICATION

This application claims priority under 35 U.S.C. §119 from Japanese Patent Application No. 2007-145525 filed on May 31, 2007. The entire subject matter of the application is incorporated herein by reference.

BACKGROUND

1. Technical Field

The following description relates to a print control device, a printing system employing the print control device and a computer-readable recording medium storing printing program for converting print data including header information to printer control information and transmits the converted information (i.e., the printer control information) to a printer.

2. Related Art

Conventionally, there is known a print control device such as a personal computer which converts print data representing images to be printed into printer control information such as PDL (Page Description Language) data or PDF (Portable Document Format) data and outputs the same. It sometimes necessary to input job control information such as a PJL (Printer Job Language) command (hereinafter, referred to as a job control command) or the like into the printer to make various operational instructions in addition to the above-mentioned printer control information. In Japanese Patent Provisional Publication No. 2005-92744, disclosed is a technique for writing PDF data and PJL commands into a spooler, and transmits the same to the printer.

SUMMARY OF THE INVENTION

Among printer control devices provided with a filter, there are some which require that data to be processed (hereinafter, referred to as subjective data) should have a specific format. In such devices, since a job control command (e.g., the PJL command) alone does not have the specific format, the PJL command may not be transmitted to the printer. Generally, job control information such as the PJL commands can be transmitted to the printer in accordance with a process independent of a process of a printer driver. However, such an operation requires a user to have specialized knowledge.

In consideration of the above, the present invention is advantageous in that an improved print control device capable of transmitting job control information to a printer in a manner similar to a case where the printer control information is transmitted to the printer, when a printing operation is to be executed.

In accordance with an aspect of the present invention, there is provided a print controlling device which controls a printer connected thereto by transmitting printer controlling information. The print controlling device is provided with a print setting data generating module configured to generate print setting data based on desired print settings, a print data generating module configured to generate print data including the print setting data as header information thereof, and a converting module configured to convert the print data generated by the print data generating module to the printer controlling information and transmit the printer controlling information to the printer. The print setting data generating module is capable of generating operational control setting data in accordance with a setting by a user, and the converting module includes a judging module configured to judge whether the print setting data included in the print data contains the operational control setting, and a job control information transmitting module configured to transmit job controlling information which corresponds to the operational control setting to the printer if the judging module judges that the print setting data includes the operational control setting.

According to further aspects of the invention, there is provided with a printing system including the print controlling device configured as above and a printer which is connected to the print controlling device via a network, the print controlling device controlling the printer by transmitting printer controlling information.

According to further aspects of the invention, there is provided a computer accessible recording medium containing a program to be executed by a computer, the program causing the computer to control a printer connected to the computer by transmitting printer controlling information. The program contained in the recording medium includes the instructions of first generating print setting data based on desired print settings, the first generating step being capable of generating operational control setting data in accordance with a setting by a user, second generating print data including the print setting data as header information thereof, and converting the print data to the printer controlling information. The converting step includes judging whether the print setting data included in the print data contains the operational control setting, and transmitting job controlling information which corresponds to the operational control setting to the printer if the judging step judges that the print setting data includes the operational control setting.

According to the above described print controlling device, printing system and recoding medium containing the program, it becomes possible that print control device transmits job control information to the printer in a manner similar to a case where the printer control information is transmitted to the printer, when a printing operation is to be executed.

According to further aspects of the invention, there is provided a print controller which controls a printer by transmitting printer controlling information. The print controller includes a user interface module configured to interface between a user and the print controller and a printer controlling module configured to control the printer. The user interface module is provided with a print setting data generating module configured to generate print setting data based on desired print settings and operational control setting data in accordance with a setting by the user, and a print data generating module configured to generate print data including the print setting data as header information of the print data. Further, the printer controlling module is provided with a transforming module configured to transform the print data in accordance with the print setting data, a judging module configured to judge whether the print setting data included in the print data contains an operational control setting, a job control information transmitting module configured to transmit job controlling information which corresponds to the operational control setting to the printer if the judging module judges that the print setting data includes the operational control setting, a converting module configured to convert the print data generated by the print data generating module to the printer controlling information, and a transmitting module configured to transmit the printer controlling information to the printer.

According to the print controller described above, the user interface may generate the print data which includes the operational control setting, and the printer controlling device transmits the job controlling information to the printer if the operational control setting is included in the print data.

BRIEF DESCRIPTION OF THE ACCOMPANYING DRAWINGS

FIGS. 5A and 5B schematically show examples of print data created when the printing operation is to be executed and print data for acquiring a serial number of the printer.

Figure 4:
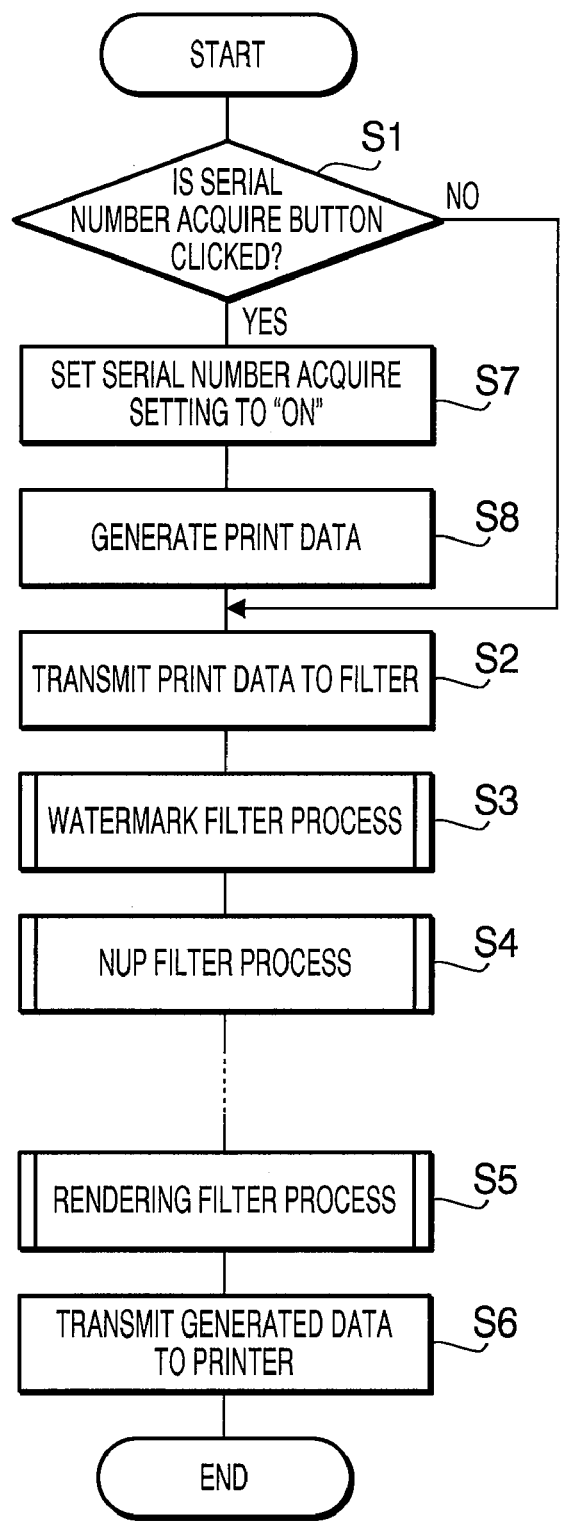
FIG. 4 is a flowchart illustrating a printing process executed when the personal computer executes a printing operation.
Figure 6:
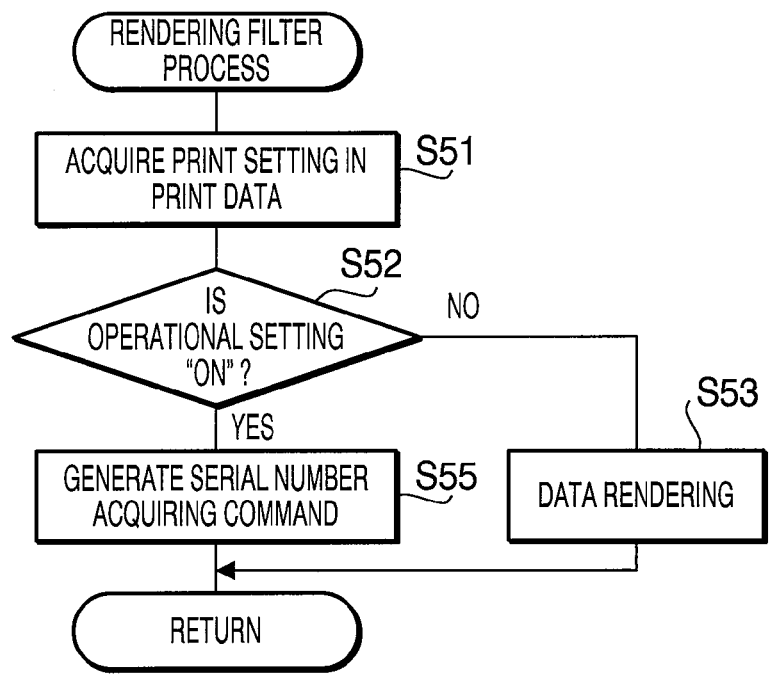

FIG. 6 is a flowchart illustrating a rendering filter process which is called during the printing process shown in FIG. 4.

Figure 7:
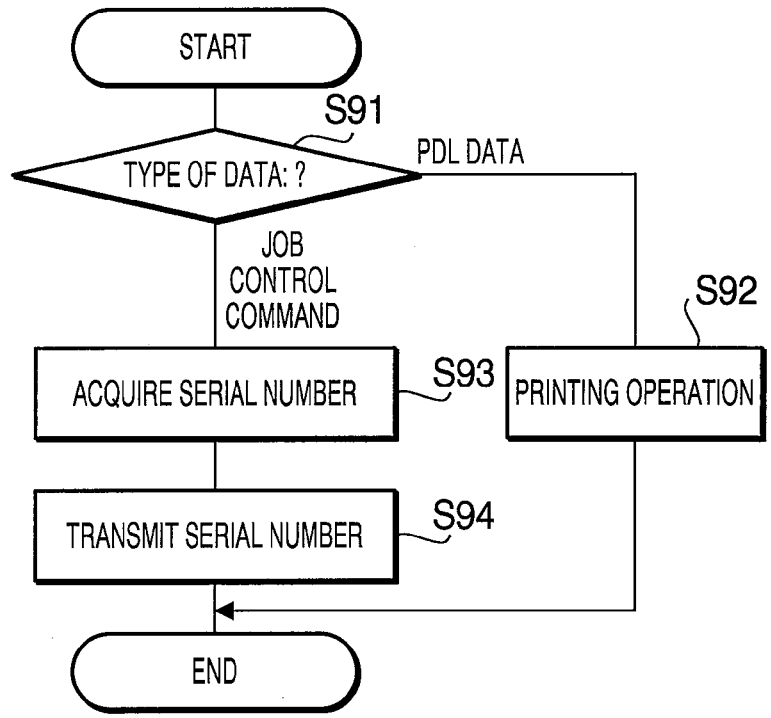

FIG. 7 is a flowchart illustrating a process executed by a printer of the printing system.

FIG. 8 shows a modification of the print data for acquiring a serial number.

DETAILED DESCRIPTION OF THE EMBODIMENTS

Referring now to the drawings, a description will be given in detail of preferred embodiment in accordance with the present invention.

Figure 1:
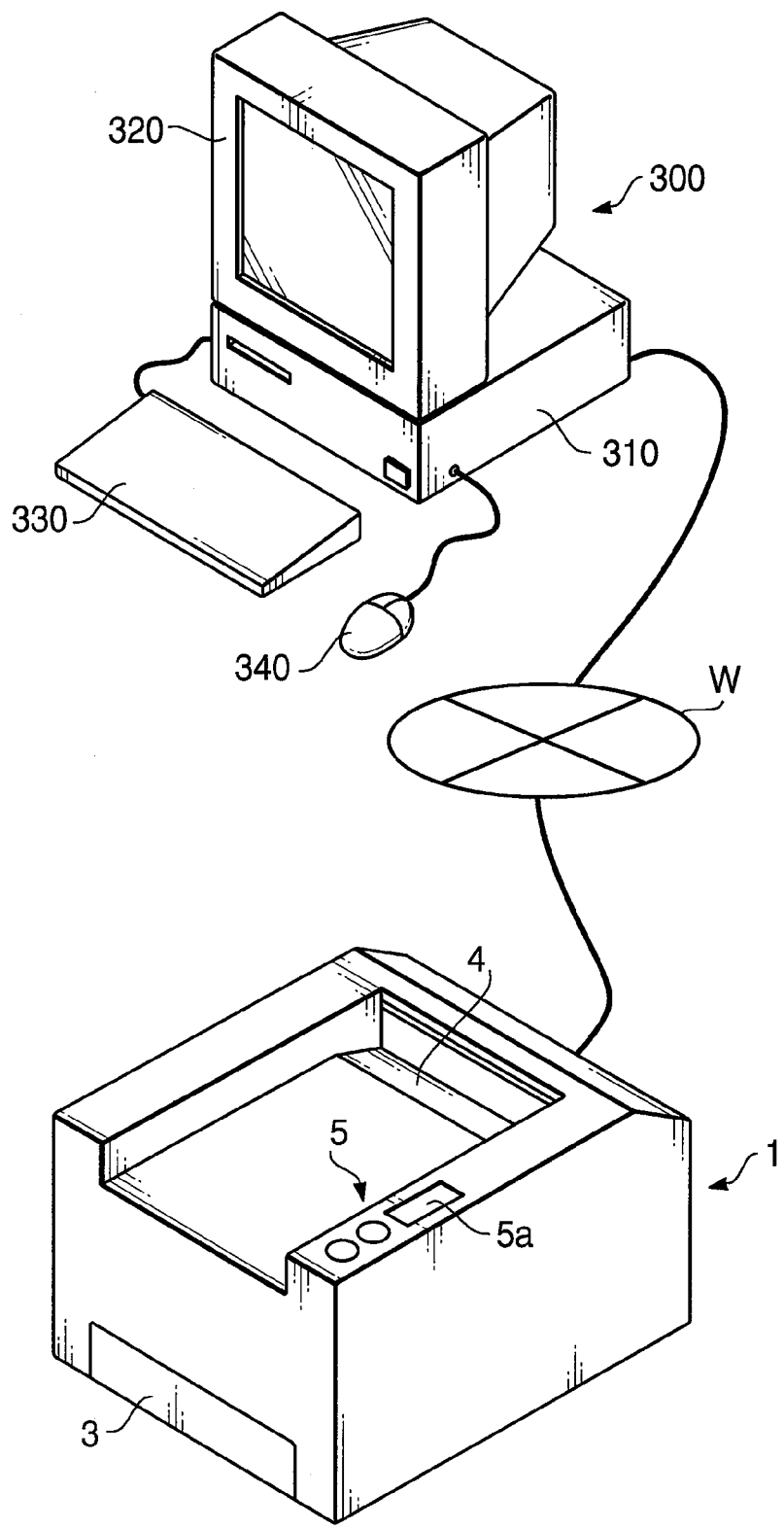
FIG. 1 is a perspective view schematically showing an appearance of a printing system to which the present invention is applied.

FIG. 1 is a perspective view of a printing system according to an embodiment of the invention. The printing system includes, as show in FIG. 1, a color laser printer (hereinafter, simply referred to as a printer) 1, and a personal computer (hereinafter, referred to as a PC) 300, which is connected with the printer 1 via a network W such as a LAN (Local Area Network) or the Internet. It should be noted that, a plurality of printers may be additionally connected to the network W.

The printer 1 is provided with a well-known printer engine 2 (see FIG. 2) which is configured to form images in accordance with a so-called electro-photographic imaging process, using yellow, magenta, cyan and black toners. The printer engine 2 forms images on recording sheets on page basis. Specifically, the recording sheets are accommodated in a sheet feed tray 3 and fed inside the printer 1 one by one. The printer engine 2 forms an image on each of the recording sheets, which are discharged on a stacker 4. On an outer surface of the printer 1, a operation panel 5 is provided, which includes various operation buttons including a display button 5a, which are operable by a user to input various settings and operational commands.

Figure 2:
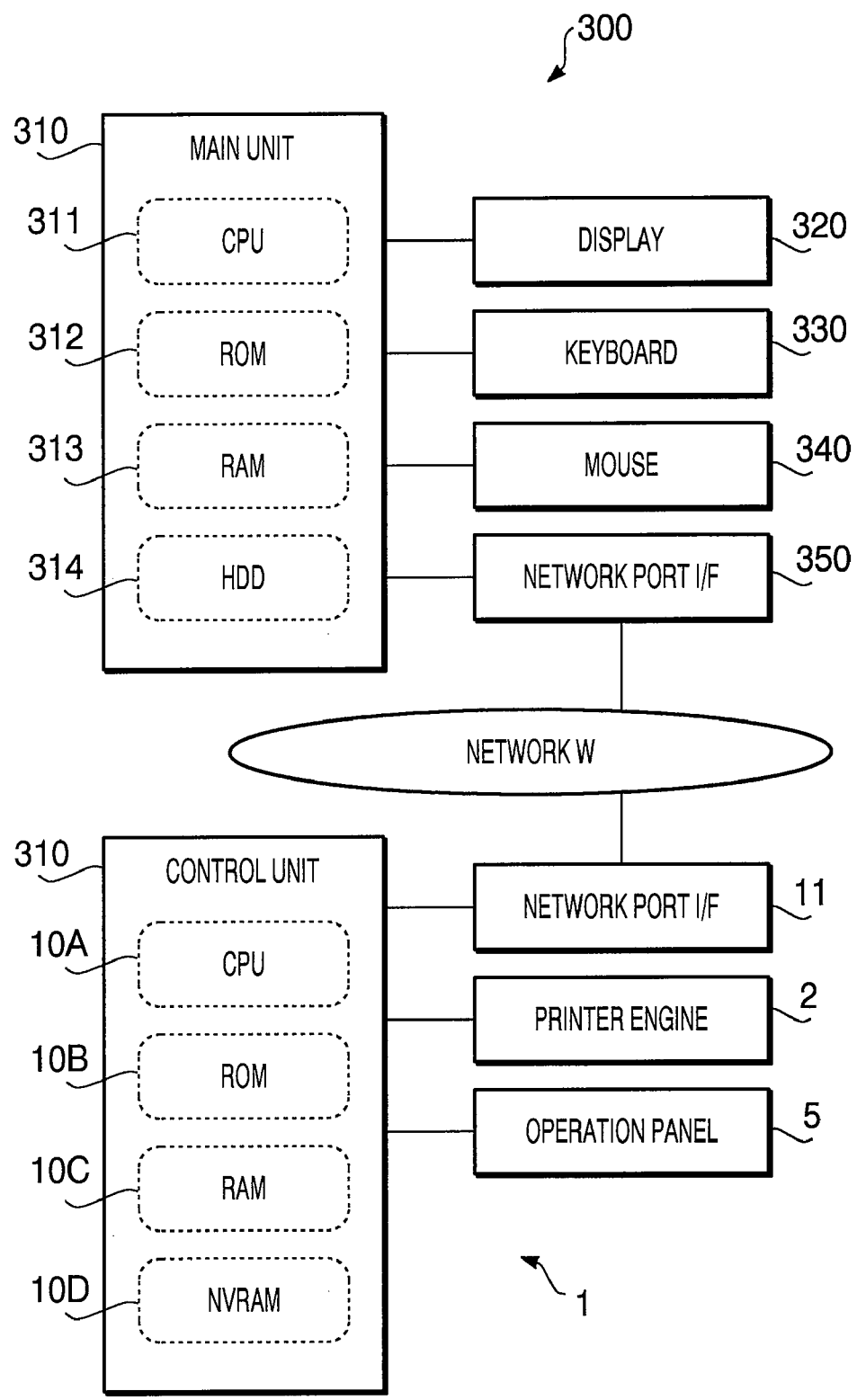
FIG. 2 is a block diagram showing a configuration of a control system of the printing system shown in FIG. 1.

FIG. 2 is a block diagram showing an electrical configuration of the printing system.

As shown in FIG. 2, a main body 310 of the PC 300 includes a CPU (Central Processing Unit) 311, a ROM (Read Only Memory) 312, a RAM (Random Access Memory) 313, and an HDD (Hard Disk Drive) 314. To the main body 310, a display 320 such as a CRT (Cathode Ray Tube), a keyboard 330 and a mouse 340 are connected (see FIG. 1). Further, the main body 310 of the PC 300 is provided with a network port I/F (interface) 350 for connecting the PC 300 to the network W or a public telephone line.

The printer 1 is provided with a control unit 10 for controlling the printer engine 2 and the like. The control unit 10 is configured as a microcomputer provided with a CPU 10A, a ROM 10B and a RAM 10C. The control unit 10 is also provided with an NVRAM (Non-Volatile RAM) 10D which retains data even if power supply is off. The printer 1 further includes a network port I/F (interface) 11 for connecting the printer 1 with the PC 300 via the network W.

Figure 3:
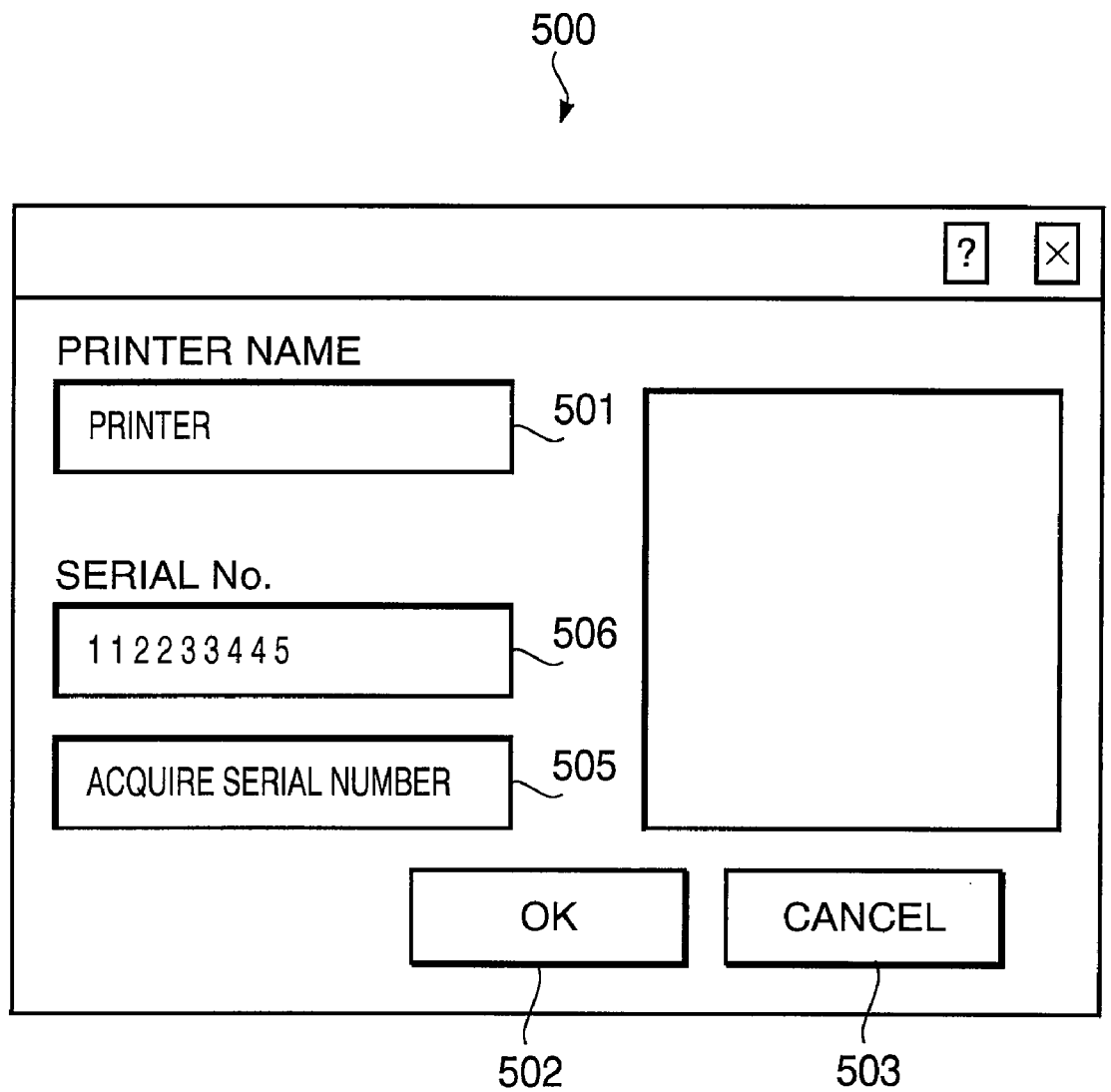
FIG. 3 shows a user interface for printing which is displayed on a display of a personal computer of the printing system.

Next, a process executed by the control system described above will be described. FIG. 3 shows a user interface 500 which is a dialogue window displayed when the print data is generated with an application in the PC 300 and the user instructs to start a printing operation. It should be noted that the user interface 500 is displayed during execution of the application, using a module of the printer driver. Incidentally, during execution of the application, with use of appropriate modules of the printer driver, various settings such as a size of the recording sheet, the number of copies, a setting or watermark printing, N-up (i.e., a collective printing for arranging reduced images for N pages on one side of a recording sheet) and the like can be made.

As shown in FIG. 3, the user interface 500 includes well-known printer name indicating section 501, OK button 502 for executing the printing operation, and cancel button 503 for terminating the printing operation.

Further, as shown in FIG. 3, the user interface 500 includes the following sections/buttons. That is, the user interface 500 includes a serial number acquiring button 505 for instructing to acquire a serial number of the printer 1 from the printer 1 and a serial number indicating section 506 for displaying the serial number of the printer 1 as acquired in response to the instruction which is issued upon clicking of the serial number acquiring button 505. It should be noted that, according to the embodiment, a serial number acquiring command is referred to as an example of a job control command to be transmitted to the printer 1 using the user interface 500. The job control command need not be limited to this serial number acquiring command, and any other suitable job control command can be transmitted in the similar manner, optionally or alternatively.

If the OK button 502 or the serial number acquiring button 505 is clicked (hereinafter, occasionally referred to as depressed) with the mouse 340, the CPU 311 of the PC 300 executes, based on a program stored in the HDD 314, the printing process shown in FIG. 4.

As shown in FIG. 4, when the printing process starts, the process judges whether the printing process is started as the OK button 502 is depressed (which is a normal printing operation) or as the serial number acquiring button 505 is depressed in S1. If the process is started as the OK button 502 is depressed (S1: NO), the process proceeds to S2 and the print data generated by the application is transmitted to the filter. Then, by the filter, various well-known filter processes such as a watermark filter process (S3), an N-up filter process (S4) and the like will be executed.

FIG. 5A shows an example of the print data generated by the application when the normal printing operation is executed. In this case, as shown in FIG. 5A, the print data includes print settings (header information) and the main data (print data) is generated as an XML file configuration. It should be noted that, in FIG. 5A, "<*>" means the beginning of data represented by a string "*" and "</***>" means the end of the data. In the example shown in FIG. 5A, to the setting items of the size of the recording sheet, the number of the copies, parameters are set. These parameters correspond to the settings made by the application. Since the serial number acquiring button 505 is not depressed, the serial number acquire command is not described (set) or the serial number acquire command is set to "OFF."

In the filter processes in S3 and S4, the filter processes corresponding to the print settings are executed. Then, the process proceeds to S5. In S5, a rendering filter process (described later) is executed and the print data represented by the XML language is converted into the PDL language data. Then, in S6, the converted print data is transmitted to the printer 1, and the process is terminated.

If the printing process is started as the serial number acquiring button 505 has been depressed (S1: YES), an operational setting data in which the serial number setting is "ON" is generated in S7. Then, in S8, the print data including the operational setting is generated in the XML format, and the process proceeds to S2.

FIG. 5B shows an example of the print data generated in S8. This print data has the XML file format similar to the print data generated by the application. As shown in FIG. 5B, in the print setting section (header information), the serial number acquire setting is set to "ON" corresponding to the processes executed in S7 and S8. It should be noted that, according to the embodiment, this setting (hereinafter, referred to as an operational setting) corresponds to a job control command for acquiring a serial number of the printer 1. This may be modified such that, as shown in FIG. 8, a PJL command to be transmitted to the printer 1 may be written as shown at the operational command part of the print setting section of the print data.

In the main data, text data indicating "This printer does not support the serial number acquiring function" is included. This data corresponds to the operational setting included in the print setting section. As will be described later, if the printer 1 does not support the function set by the operational setting, the text data included in the main data will be used to notify the user of unavailability of the function. It should be noted that generation of the print data in S8 may be done using the module which is also used in the application normally. Alternatively, a dedicated program module different from the module which is normally used in the application may be used.

In S2, the print data generated in S8 is sent to the filter processes in S3-S5. According to the conventional art, since the PJL command does not have the XML file format, the print data cannot pass through the filter processes of S3-S5 and an error occurs. Thus, in the conventional art, the PJL command alone cannot be transmitted to the printer 1.

According to the embodiment, the print data generated in S8 is described in accordance with the XML file format. Therefore, the print data can pass through the filter processes in S3-S5 (i.e., allowed to pass through the filter processing modules used in S3-S5).

It should be noted that the print data generated in S8 does not have the print settings to meet the filter processes of S3-S4. Therefore, the print data generated in S8 only passes through the filter processing modules and the filter processes are not applied to the print data.

Next, in S5, a rendering filter process is executed. FIG. 6 is a flowchart illustrating the rendering filter process.

As shown in FIG. 6, when the rendering filter process is started, in S51, the process acquires the print setting included in the print data. Then, in S52, the process judges whether the operational setting (i.e., in this exemplary embodiment, the serial number acquire setting) is set to ON or OFF. If the operational setting (i.e., the serial number acquire setting) is OFF, or if the job control command (i.e., in this exemplary embodiment, the command regarding the serial number acquire setting) is not included in the print setting section (S52: NO), the process applies a normal rendering filter process to the print data, in which the PDL format print data is generated based on the print data of the XML format. Then, the process proceeds to S6 (see FIG. 4), in which the PDL format print data is transmitted to the printer 1. If the serial number acquire setting is ON (S52: YES), the process generates a serial number acquiring command as a PJL command (i.e., a job control command) in S55. At this stage, the main data of the print data generated in S8 of the printing process is deleted. Next, when the process returns to S6, the job control command (i.e., according to the embodiment, the serial number acquiring command) is transmitted to the printer 1, and the rendering filter process is terminated.

FIG. 7 is a flowchart illustrating a process performed when the CPU 10 of the printer 1 executes a program stored in the ROM 10B. It should be noted that the process shown in FIG. 7 is started when the printer 1 receives the data transmitted from the PC 300 in S6 of FIG. 6.

As shown in FIG. 7, firstly the process judges a type of the data received from the PC 300 in S91. If the received data is the PDL data (S91: PDL data), the process proceeds to S92 and executes the normal printing operation based on the received PDL data. Then, the process shown in FIG. 7 is terminated.

If the received data is the serial number acquiring command (S91: JOB CONTROL COMMAND), the process proceeds to S93 and executes an operation corresponding to the job control command received from the PC 300. That is, according to the exemplary embodiment, the process acquires the serial number of the printer 1 which is stored in the ROM 10B. In S94, the process returns the result of the operation executed in S93 to the PC 300, if necessary. That is, according to the exemplary embodiment, the process transmits the acquired serial number to the PC 300, and the process is terminated. In the PC 300, upon receipt, the serial number is displayed on a serial number displaying section 506.

As described above, when the serial number acquire button 505 of the user I/F 500 is clicked (S1: YES), the print data of which the serial number acquire setting of the print setting is ON is generated (S7 and S8). Similar to the normal print data, the print data generated in S7 and S8 has the XML format (see FIGS. 5A and 5B), and passes through the filter processes (S3, S4). Accordingly, in the rendering filter process in S5, the serial number acquiring command having the PJL format is generated and transmitted to the printer 1 (S55, S6). Therefore, similar to a case where the normal printing is executed, even a user unfamiliar with the operation of the printer 1 can transmit the job control command (e.g., the command for acquiring the serial number of the printer 1) to the printer 1. Further, when the ON button is clicked on a print setting screen displayed by application (S1: NO), the print data having the PDL format is generated (S54, S6), the printing operation can be executed similar to a case where the normally used printer driver is used.

Further, when the serial number acquiring command is generated, the main data of the print data generated in S8 is deleted (S55) and only the serial number acquiring command is transmitted to the printer 1 (S6). Therefore, unnecessary operation of the printer 1 such as printing of unnecessary image or feeding of the recording sheets will not be executed.

The rendering filter process is provided for each printer on the network W. Therefore, for a printer in which the process corresponding to the serial number acquiring command cannot be executed, the rendering filter process of S5 serves as a process only to execute S53 of FIG. 6. In such a case, the serial number acquire setting of the print setting is not recognized, and the text data (which is included in the main data) is also transmitted to the printer. The text data corresponds to letter string "This printer does not support the serial number acquiring function." Thus, the printer which received the text data prints out the text on the recording sheet. With this configuration, the user can recognize that the printer does not deal with the serial number acquiring command.

If the printer supports the serial number acquiring command, the main data of the print data is deleted when the serial number acquiring command is generated (S55). Therefore, the above text data is not printed on the recording sheet.

It should be noted that the present invention need not be limited to the configuration of the above-described exemplary embodiment, but various modifications can be made without departing from the scope of the invention. For example, as the PJL command to be sent to the printer 1, a printer setting command (for printing the printer setting information), a command for acquiring the status of the printer, a command for acquiring a calibration data and the like may be alternatively or optionally transmittable. Further, the main data of the print data generated in S8 may be null data (containing no data). That is, in S8, only the operational setting may be made. Furthermore, in S52, the process may proceed to "NO" side if the printer 1 (which can be selected with the printer name displaying section 501 of the user I/F 500) does not have the serial number acquiring function.

As described above referring to FIG. 8, the PJL command to be transmitted to the printer may be directly written at the operational command section of the print setting section of the print data. In such a case, in the rendering filter process, it is judged whether the operational command (e.g., the PJL command) is written in the print setting section. Then, if it is judged to be written, the PJL command is transmitted to the printer 1. Otherwise (if the operational command is not written in the print setting section), the normal printing operation is executed. By adding a tag of <operational setting> and using "ON" or "OFF" to activate/deactivate the operational setting, the same effect can be obtained. According to such a configuration, various types of PJL commands can be transmitted to the printer 1.

Further, the above-described processes of creating setting data and print data may be configured to be called by another application. In such a case, similar to S7 and S8 described above, the processes may operate as part of the application to create the print data.

According to the embodiment, the main data (i.e., the XML format print data which does not include the operational setting) is created by the application. However, the invention need not be limited to such a configuration, and the print control device may be configured to create the main data.

What is claimed is:

1. A print controlling device configured to control a printer by transmitting printer controlling information, comprising:
   a processor; and
   memory storing computer readable instructions that, when executed, cause at least one portion of the print controlling device to function as:
   a print setting data generating module configured to generate print setting data based on desired print settings;
   a print data generating module configured to generate print data including the print setting data as header information thereof, and
   a converting module configured to convert the print data generated by the print data generating module to the printer controlling information and to transmit the printer controlling information to the printer, wherein the print setting data generating module is capable of generating operational control setting data in accordance with an operational control setting by a user,
   wherein the converting module includes:
   a judging module configured to judge:
      whether the print setting data included in the print data includes the operational control setting data, and
      whether the printer is capable of executing the operational control setting; and
   a job control information transmitting module configured to:
      in response to determining that the print data includes the operational control setting data and that the printer is capable of executing the operational control setting, generate job controlling information using the print setting data and transmit only the generated job controlling information which corresponds to the operational control setting to the printer, and
      in response to determining that the print data includes the operational control setting data and that the printer is not capable of executing the operational control setting, transmit the print data to the printer without generating and transmitting the job controlling information corresponding to the operational control setting, and
   wherein, when the judging module judges that the print setting data includes the operational control setting data, generating the job controlling information includes deleting contents of the print data other than the operational control setting data before generating and transmitting the job controlling information to the printer.

2. The print controlling device according to claim 1, wherein the converting module further includes a normal process executing module configured to transmit the printer controlling information to the printer if the judging module judges that the print setting data does not include the operational control setting.

3. The print controlling device according to claim 1, wherein the print data generating module is further configured to incorporate incapability indicating data representing that the printer is incapable of operating based on the operational control setting into the print data when the print data generating module generates the print data including the print setting data containing the operational control setting.

4. A printing system including a print controlling device and a printer connected to the print controlling device, the print controlling device controlling the printer by transmitting printer controlling information,
   the print controlling device comprising memory storing computer readable instructions that, when executed, cause at least a portion of the print controlling device to function as:
   a print setting data generating module configured to generate print setting data based on desired print settings;
   a print data generating module configured to generate print data including the print setting data as header information thereof; and
   a converting module configured to convert the print data generated by the print data generating module to the printer controlling information and transmit the printer controlling information to the printer, wherein the print setting data generating module is capable of generating operational control setting data in accordance with an operational control setting by a user,
wherein the converting module includes:
a judging module configured to judge:
whether the print setting data included in the print data includes the operational control setting data, and
whether the printer is capable of executing the operational control setting; and
a job control information transmitting module configured to:
in response to determining that the print data includes the operational control setting data and that the printer is capable of executing the operational control setting, generate job controlling information using the print setting data and transmit only the generated job controlling information which corresponds to the operational control setting to the printer, and
in response to determining that the print data includes the operational control setting data and that the printer is not capable of executing the operational control setting, transmit the print data to the printer without generating and transmitting the job controlling information corresponding to the operational control setting, and
wherein, when the judging module judges that the print setting data includes the operational control setting data, generating the job controlling information includes deleting contents of the print data other than the operational control setting data before generating and transmitting the job controlling information to the printer.

5. The printing system according to claim 4,
wherein the printer memory storing computer executable instructions that, when executed, cause at least a portion of the printer to function as:
a data receiving module configured to receive data transmitted from the print controlling device;
a data type judging module configured to judge whether the data received by the data receiving module is print data or job control command; and
a job controlling module configured to control the printer to operate in accordance with the job control command if the data type judging module judges that the type of the data received by the data receiving module is the job control command.

6. The printing system according to claim 5,
wherein the computer readable instructions, when executed, further cause the at least a portion of the printer to function as a transmitting module configured to transmit a result of an operation which is executed in accordance with the job control command to the print controlling device.

7. The printing system according to claim 4,
wherein the print data generating module is further configured to incorporate incapability indicating data representing that the printer is incapable of operating based on the operational control setting in the print data when the print data generating module generates the print data including the print setting data containing the operational control setting.

8. The printing system according to claim 7,
wherein the computer readable instructions, when executed, further cause the at least a portion of the printer to function as a print controlling module configured to control the printer to execute a printing operation in accordance with the print data containing the incapability indicating data.

9. A non-transitory computer accessible recording medium storing a program executable by a computer, the program causing the computer to control a printer by transmitting printer controlling information, the program containing instructions for:
generating print setting data based on desired print settings, including generating operational control setting data in accordance with an operational control setting by a user;
generating print data including the print setting data as header information thereof; and
converting the print data to the printer controlling information, the converting step including:
judging whether the print setting data included in the print data includes the operational control setting data;
judging whether the printer is capable of executing the operational control setting;
in response to determining that the print data includes the operational control setting data and that the printer is capable of executing the operational control setting, generating job controlling information using the print setting data and transmitting only the generated job controlling information which corresponds to the operational control setting to the printer; and
in response to determining that the print data includes the operational control setting data and that the printer is not capable of executing the operational control setting, transmitting the print data to the printer without generating and transmitting the job controlling information corresponding to the operational control setting,
wherein, when the print setting data includes the operational control setting data, generating the job controlling information includes deleting contents of the print data other than the operational control setting data before generating and transmitting the job controlling information to the printer.

10. The recording medium according to claim 9,
wherein the converting step further includes a normal process executing step which transmits the printer controlling information to the printer if the judging step judges that the print setting data does not include the operational control setting.

11. The recording medium according to claim 9,
wherein generating the print setting data includes incorporating incapability indicating data representing that the printer is incapable of operating based on the operational control setting into the print data when the first generating step generates the print data including the print setting data containing the operational control setting.

12. A print controller configured to control a printer by transmitting printer controlling information, comprising computer executable instructions that, when executed, cause the print controller to provide:
a user interface module configured to interface between a user and the print controller; and
a printer controlling module configured to control the printer,
wherein the user interface module comprises:
a print setting data generating module configured to generate print setting data based on desired print settings and operational control setting data in accordance with an operational control setting by the user; and a print data generating module configured to generate print data including the print setting data as header information of the print data, and wherein the printer controlling module comprises: a transforming module configured to transform the print data in accordance with the print setting data;

a judging module configured to judge:

whether the print setting data included in the print data includes an operational control setting data, and whether the printer is capable of executing the operational control setting;

a job control information transmitting module configured to:

in response to determining that the print data includes the operational control setting data and that the printer is capable of executing the operational control setting, generate job controlling information using the print setting data and transmit only the generated job controlling information which corresponds to the operational control setting to the printer if the judging module judges that the print setting data includes the operational control setting, and in response to determining that the print data includes the operational control setting data and that the printer is not capable of executing the operational control setting, transmit the print data to the printer without generating and transmitting the job controlling information corresponding to the operational control setting;

a converting module configured to convert the print data generated by the print data generating module to the printer controlling information; and a transmitting module configured to transmit the printer controlling information to the printer, and wherein, when the judging module judges that the print setting data includes the operational control setting data, generating the job controlling information includes deleting contents of the print data other than the operational control setting data before generating and transmitting the job controlling information to the printer.

\* \* \* \* \*